(12) United States Patent
Johnson et al.

(10) Patent No.: US 9,311,319 B2
(45) Date of Patent: Apr. 12, 2016

(54) METHOD AND SYSTEM FOR ADMINISTRATION OF STORAGE OBJECTS

(75) Inventors: Eric Earl Johnson, Colorado Springs, CO (US); Jefferson Nathan Lee, Colorado Springs, CO (US); Timothy L. Virgo, Colorado Springs, CO (US); Travis J. Feuling, Colorado Springs, CO (US); Todd E. Barkalow, Colorado Springs, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 701 days.

(21) Appl. No.: 12/548,869

(22) Filed: Aug. 27, 2009

(65) Prior Publication Data

US 2011/0051623 A1    Mar. 3, 2011

(51) Int. Cl.
*G06F 17/30* (2006.01)

(52) U.S. Cl.
CPC .... *G06F 17/30126* (2013.01); *G06F 17/30197* (2013.01)

(58) Field of Classification Search
CPC .............. G06F 17/30126; G06F 17/30197; G06F 11/1464; G06F 3/065; G06F 11/2069; G06F 2201/84; G06F 3/0619; G06F 17/30194

USPC .............. 370/254, 255, 256; 711/100, 114
See application file for complete search history.

(56) References Cited

U.S. PATENT DOCUMENTS

| | | | |
|---|---|---|---|
| 6,742,020 B1 | 5/2004 | Dimitroff et al. | |
| 6,772,231 B2 | 8/2004 | Reuter et al. | |
| 6,812,941 B1 * | 11/2004 | Brown et al. | 715/854 |
| 6,977,927 B1 | 12/2005 | Bates et al. | |
| 7,051,122 B2 | 5/2006 | Reuter et al. | |
| 7,325,097 B1 * | 1/2008 | Darcy | 711/117 |
| 7,343,429 B1 * | 3/2008 | Bauer et al. | 709/252 |
| 7,496,646 B2 | 2/2009 | Casper et al. | |
| 7,797,355 B1 * | 9/2010 | Lanzatella et al. | 707/810 |
| 2006/0020572 A1 * | 1/2006 | Ishii et al. | 707/1 |

* cited by examiner

*Primary Examiner* — Jung Park
(74) *Attorney, Agent, or Firm* — International IP Law Group, PLLC (57) ABSTRACT

An exemplary embodiment of the present invention provides a method of generating a representation of a storage network. The method includes obtaining an request from a client system to view contents of a node in a tree model. The method also includes receiving tree information corresponding to the node and adding the tree information to the tree model.

16 Claims, 6 Drawing Sheets

|  | Current | | Prior | | | |
|---|---|---|---|---|---|---|
|  | Node | Child | Node | Child | Depth | Parent |
| Tree Source 1 | 1 | 1 | 1 | 1 | 1 | Null |
| Tree Source 2 | 1 | 1 | 1 | 1 | 1 | Null |
| Tree Source N | 1 | 1 | 1 | 1 | 1 | Null |

FIG. 3

|  | Current | | Prior | | | |
|---|---|---|---|---|---|---|
|  | Node | Child | Node | Child | Depth | Parent |
| Tree Source 1 | 1 | 1 | 1 | 1 | 1 | Null |
| →A | 1 | 1 | 1 | 1 | 2 | TS 1 |
| →B | 1 | 1 | 1 | 1 | 2 | TS 1 |
| →C | 1 | 1 | 1 | 1 | 2 | TS 1 |
| →D | 1 | 1 | 1 | 1 | 3 | C |
| →E | 1 | 1 | 1 | 1 | 3 | C |
| Tree Source 2 | 1 | 1 | 1 | 1 | 1 | Null |
| Tree Source N | 1 | 1 | 1 | 1 | 1 | Null |

|  | Current | | Prior | | | |
| --- | --- | --- | --- | --- | --- | --- |
|  | Node | Child | Node | Child | Depth | Parent |
| Tree Source 1 | 1 | 3 | 1 | 1 | 1 | Null |
| →A | 2 | 1 | 1 | 1 | 2 | TS 1 |
| →B | 1 | 1 | 1 | 1 | 2 | TS 1 |
| →C | 1 | 2 | 1 | 1 | 2 | TS 1 |
| →D | 1 | 1 | 1 | 1 | 3 | C |
| →E | 2 | 1 | 1 | 1 | 3 | C |
| Tree Source 2 | 1 | 1 | 1 | 1 | 1 | Null |
| Tree Source N | 1 | 1 | 1 | 1 | 1 | Null |

METHOD AND SYSTEM FOR ADMINISTRATION OF STORAGE OBJECTS

BACKGROUND

A business network may include large number of storage objects, such as multiple disk arrays, network-attached storage (NAS) devices, and the like. Moreover, a large network may contain thousands of storage devices. To provide a client system access to the storage network, the storage network may be represented graphically to the client system in the form of a hierarchical tree of folders and subfolders. The client system may view, navigate, and manage all of the folders and files included in the tree.

Typically, an image of the network will be created and maintained by a central server that acquires information from each storage device in the network. The server aggregates all of the storage devices in the network into a single tree model representing the entire network. Maintaining the tree model for the entire network may use significant processing resources.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Exemplary embodiments of the present invention provide techniques for displaying a large number of objects in a hierarchical tree, while reducing the processing resources used by the server that maintains the tree. In exemplary embodiments of the present invention, the server accesses and updates those parts of the storage tree that are currently being viewed by a client system and adds those parts of the tree to a tree model. As used herein, the term "tree model" refers to the representation of the storage network that is stored on the server and used to generate the graphical representation of the storage network that is displayed to a client.

The storage network may include several root nodes or tree sources from which the tree model may be generated. Changes to the files or tree structure of any particular tree source may cause the tree source to send an event to the server that causes the server to update the tree model. In this way, the server retrieves information about nodes that have potentially changed and are actively being viewed by a client system. Thus, the server may generate a smaller tree model that may not include network resources that are not being accessed by a client, and the processing resources devoted to maintaining the tree model may be reduced.

Figure 1:
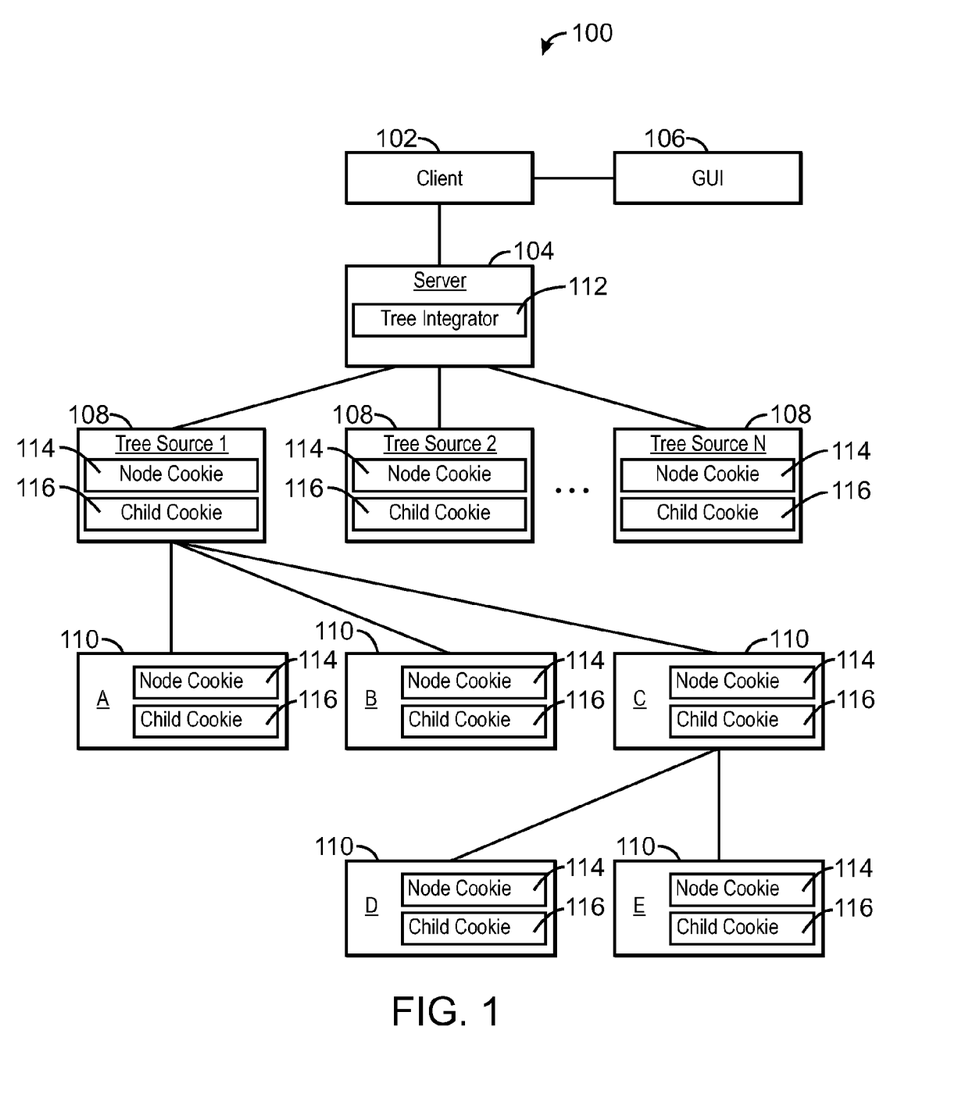
FIG. 1 is a block diagram of a storage network in which a client system can access storage devices through a server, in accordance with exemplary embodiments of the present invention.

FIG. 1 is a block diagram of a storage network in which a client system can access storage devices through a server, in accordance with exemplary embodiments of the present invention. As illustrated in FIG. 1, a storage network 100 will generally include client system 102 and a server 104. In some exemplary embodiments of the present inventions, the network 100 may be a peer-to-peer network and may include a plurality of servers 104 and clients 102. The client system 102 may be any kind of general purpose computing device, for example, a desktop, laptop, a terminal such as a thin client, and the like.

The client system 102 will generally have a processor which may be connected to a display for displaying a graphical user interface (GUI) 106 containing the tree model. The client system 102 can also have a keyboard, and one or more input devices, such as a mouse or touch screen. The client system 102 can have other units operatively coupled to the processor, including one or more tangible, machine-readable storage media, such as a storage system for the long-term storage of operating programs and data, including the programs and data used in exemplary embodiments of the present techniques. Further, the client system 102 can have one or more other types of tangible, machine-readable media, for example, read-only memory (ROM), random access memory (RAM), or hard drives in a storage system. In exemplary embodiments, the client system 102 may include a network interface adapter, for connecting the client system 102 to the server 104.

The server 104 may provide the client system access to the storage network 100. In some exemplary embodiments, the storage network 100 may be a local area network (LAN), a wide-area network (WAN), or another network configuration. The server may also include tangible, machine-readable media, such as a storage system for the long-term storage of operating programs and data, including the programs and data used in exemplary embodiments of the present techniques.

The server 104 may be communicatively coupled to a plurality of tree sources 108. As used herein, the term "tree source" refers to any physical or virtual storage device that handles a hierarchical tree of storage objects. For example, the tree source 108 may be a storage area network (SAN), network attached storage (NAS), hard disk, redundant array of inexpensive disks (RAID), a disk drive, a drive partition, a flash drive, and the like. Each tree source 108 provides tree information to the server 104 regarding the hierarchy of storage objects 110 accessible through the tree source 108.

Each tree source 108 may handle a hierarchy of storage objects 110, which are labeled in FIG. 1 as "A," "B," "C," "D," and "E". The storage objects 110 may be physical devices, virtual devices, or a combination thereof. For example, the storage objects 110 may include virtual disk drives, RAID partitions, root directories, file folders, data tables, and the like. Each storage object may store various files and documents, for example, images, video, audio, text documents, applications, and the like. The tree sources 108 and the storage objects 110 may be used to store data, and may be referred to as "nodes." Each tree source 108 may be referred to as a "root node." Furthermore, in some embodiments, the tree source 108 may include more than one root node. For purposes of the present description, a "parent" node is a node that is higher in the tree hierarchy relative a lower or "child" node and includes the child node. A "child" node is a node that is lower in the tree hierarchy relative to a parent node and is accessible through the parent node. Each node may have respective parent nodes and child nodes. Each tree source 108 may send tree information to the server 104 regarding the respective tree source and its child nodes, as discussed below.

The server 104 may receive tree information from the tree sources 108 and generate a hierarchical tree model that represents the nodes included in the storage network 100. The tree information may include all of the information about the storage network that may be displayed on the GUI 106 of the client system 102, for example, the names of files and folders, the hierarchical structure of the tree, and other details about the files or folders such as size, date modified, file type, and the like. The tree model may include some or all of the tree information received from the tree sources 108.

In exemplary embodiments, only those nodes that are actively viewed by a client system 102 may be represented in the tree model. Relevant parts of the tree may be communicated to the client system 102 to enable the client system 102 to retrieve and store files to the network and manipulate the tree model, such as by adding or removing file folders. To generate the tree model, the server 102 may include a tree integrator 112 which generates a tree table. The term "tree table" refers to the table of tree information that is used to determine the currently viewed structure of the storage tree and whether a particular node in the tree has changed. In some exemplary embodiments, the tree sources 108 are registered in a distributed registry, and the tree integrator 104 accesses the distributed registry to determine the name and location of all the available tree sources 108. The distributed registry may be available locally to each server 104 included in the network 100. In some embodiments, the distributed registry may also be available locally on the client 102. The server 104 may register an available tree source 108 to a local discovery component, which may be stored on a tangible machine-readable medium included in the server 104. The local discovery component may distribute that registration to all other members of the discovery group, including the client 102, and other servers in the network 100. A client 102 may access a particular tree source 108 by performing a lookup on its local discovery component, which may contain entries from the discovery group. Each discovery component may have various algorithms that enable it find other discovery components on a local and wide area network.

The tree integrator 112 receives tree information from the tree sources 108 to generate an initial tree table, as discussed below. As various client systems 102 access additional parts of the storage network 100, the tree integrator 112 may obtain tree information from child nodes of the tree sources 108 and add those nodes to the tree table. The server may use the expanded tree table to generate the tree model. The server 104 may send the tree model to the client system 102 to be displayed in the GUI 106. As discussed above, the network 100 may include a plurality of servers 104. In such embodiments, the tree integrator 112 may be included in only one of the servers 104. Furthermore, the server 104 that includes the tree integrator 112 may or may not include a tree source 108.

To keep the tree model updated, each node may be associated with tree information packets, referred to herein as a "node cookies" 114 and a "child cookies" 116. As the tree source 108 makes changes to the storage network 100, the tree source 108 may also change the node cookies 114 and child cookies 116 to provide an indication to the tree integrator 104 that some part of the storage network 100 may have changed.

The cookies 114 and 116 may be any sequence of characters that uniquely identify the state of the node. For example, the cookies 114 and 116 may include an integer value, which may be incremented for each change, a hash value derived from attributes of the nodes, a time sequences, random numbers, and the like.

The node cookies 114 may be used to indicate that the respective node has changed, for example, files for folders have been added or deleted. Accordingly, if a node is changed, the respective node cookie for that node may also be changed. The child cookie 116 may be used to indicate that one or more of a node's child nodes have changed. Accordingly, if any of the node's child nodes are changed, the child cookie of the respective node will also be changed. For example, if a new file is saved to a particular node, that node's node cookie may be incremented to indicate a change in that node. Additionally, the child cookie in the node's parent nodes may also be incremented to indicate a change in a child node of the parent.

In some exemplary embodiments, the node cookies and child cookies may be stored on the respective node to which the cookie is associated. In other exemplary embodiments, some or all of the node cookies and child cookies may be stored on the server 104 or the respective tree source 108. Techniques for generating a tree table of the network 100 may be better understood with reference to FIGS. 2-4.

Figure 2:
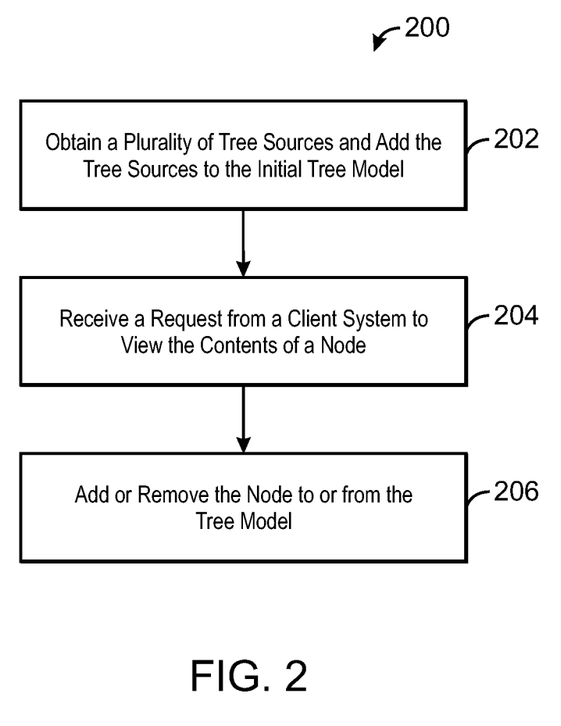
FIG. 2 is a process flow diagram of a method of generating the storage tree model, in accordance with exemplary embodiments of the present invention.

FIG. 2 is a process flow diagram of a method of generating the storage tree model, in accordance with exemplary embodiments of the present invention. The method is generally referred to by the reference number 200 and may begin at block 202, wherein the tree integrator 112 obtains the initial tree structure by obtaining information for each of the tree sources 108 from the distributed registry. For example, the tree integrator 112 may obtain basic information from each of the tree sources from the distributed registry, such as the tree source name, icon, node cookie and child cookie. Using this information, the tree integrator 112 may generate the initial tree table. An exemplary initial tree table is discussed below with reference to FIG. 3.

After generating the initial tree model, the method 200 of FIG. 2 may advance to block 204, wherein the server 104 receives an indication to view the contents of a node. When a user of the client system 102 chooses to view the contents of a node such as by opening a folder corresponding with the node, the tree table and tree model may expand to include the child nodes. Accordingly, the client system 102 may register a viewing registration for the node with the server 104. The viewing registration indicates to the server 104 that one of its client systems 102 is actively viewing the contents of that node. Conversely, when a client system 102 closes a node, the client system 102 unregisters the node with the server 104, indicating that the client system 102 is no longer actively viewing the contents of the node.

Next, at block 206, the server 104 adds the registered nodes to the tree model or removes unregistered nodes from the tree model. Upon adding a new node to the tree model, the tree integrator 112 may add the node to the tree table, as discussed further with respect to FIG. 4.

Figure 3:
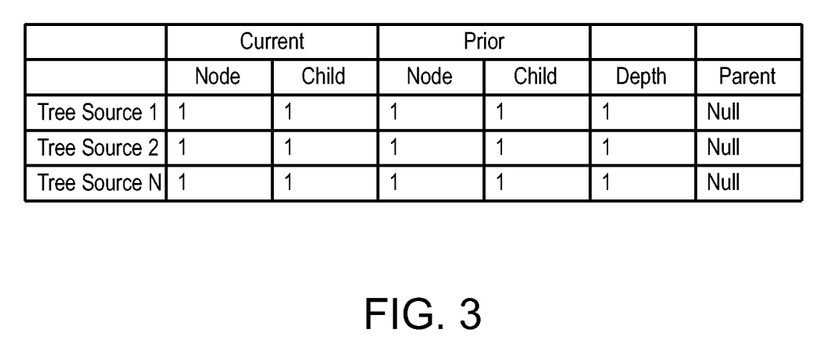
FIG. 3 is a graphical representation of an initial tree table, in accordance with exemplary embodiments of the present invention.

FIG. 3 is a graphical representation of an initial tree table, in accordance with exemplary embodiments of the present invention. The tree table of FIG. 3 represents the initial tree table that may be generated by the tree integrator 112, before the client system 102 has viewed the contents of one of the tree sources 108. Based on the tree table of FIG. 3, the server 104 may obtain tree information from the tree sources 108 to generate a tree model that includes the three tree sources 108, but no child nodes such as the storage objects 110.

As shown in FIG. 3, the initial tree table may include data for each of the tree sources 108, such as the current node cookie, current child cookie, prior node cookie, prior child cookie, depth of the node within the tree table, and the node's parent node, which for the tree sources 108 may be null. Differences between the current cookies and the prior cookies may provide an indication to the server 104 that the respective node or child node has changed. For example, the prior cookies may represent the state of the tree model from the perspective of the tree integrator 112, and the current cookies may represent the state of the tree model from the perspective of the tree source 108. The tree integrator 112 may store the prior cookies in a tangible machine-readable medium included, for example, on the server 104. Periodically, or by when triggered by events, the tree integrator 112 may retrieve the current cookies from each of the tree sources 108. A mismatch between the prior cookies and current cookies may indicate a change in the storage network 100 and may trigger the tree integrator 112 to update the relevant portion of the tree model. After updating the tree model, the updated tree model may be sent to the client system 102.

Figure 4:
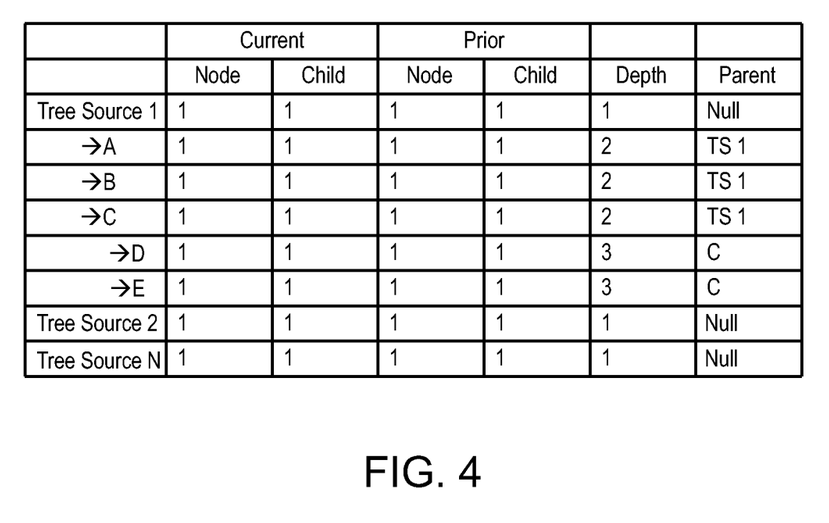
FIG. 4 is a graphical representation of the tree table after additional nodes have been accessed by the client, in accordance with exemplary embodiments of the present invention.

FIG. 4 is a graphical representation of the tree table after additional nodes have been accessed by the client, in accordance with exemplary embodiments of the present invention. As shown in FIG. 4, the client system 102 has chosen to view the contents of tree source 1 (nodes A, B, C). Additionally, the client system has chosen to view the child nodes of node C (nodes D and E). Accordingly, the root node labeled "tree source 1" and node C both have viewing registrations registered with the server 104. Accordingly, nodes A-E have been added to the tree table by the tree integrator 112. In exemplary embodiments of the present invention, the server 104 may use the tree table to determine which nodes to include in the tree model. For example, the server 104 may generate a tree model that includes each tree source 108 and each storage object 110 whose parent node has a viewing registration. It will be appreciated that the nodes in the tree table of FIG. 4 may have been added to the tree table as a result of receiving viewing registrations from a plurality of client systems 102 which may be viewing different parts of the storage network 100.

Additionally, the server 104 may also use the tree table to update the tree model. For each registered node, the server 104 will send events to the client system 102 each time that the node or one of its children has changed. The events sent to the client system 102 from the server 104 may cause the client system 102 to receive an updated view of the tree model. Conversely, when a client system 102 closes a node, the client system 102 unregisters the node with the server, in which case, the client server 102 may stop receiving events for that node. Additionally, when all viewing registrations for a node have been removed the tree integrator 112 may remove the nodes from the tree table and the server 104 may remove node from the tree model. Thus, the server 104 may no longer keep the node and its children updated in the tree model. Methods of keeping the tree model updated may be better understood with reference to FIG. 5.

Figure 5:
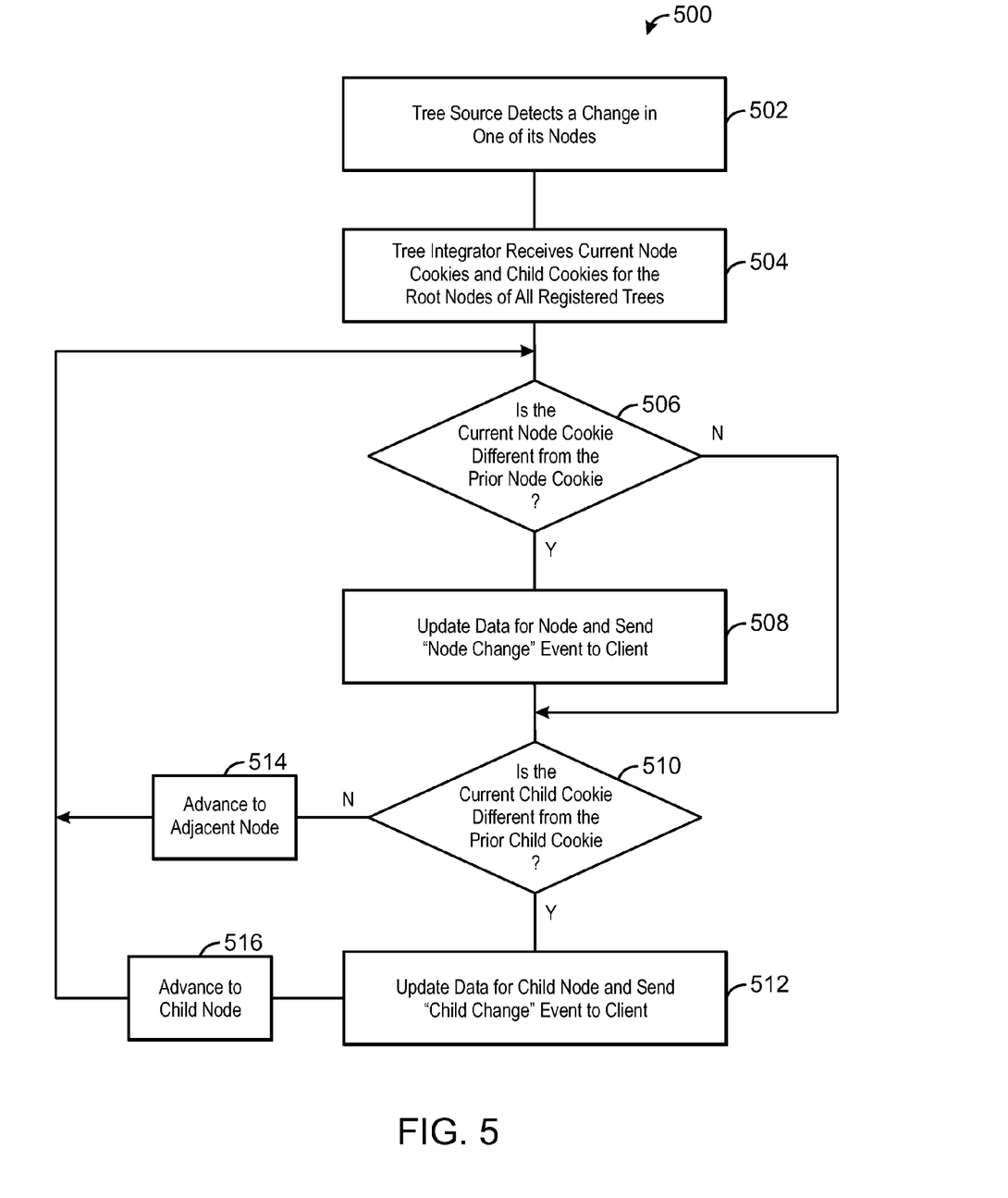
FIG. 5 is a process flow diagram of a method of updating the storage tree model, in accordance with exemplary embodiments of the present invention.

FIG. 5 is a process flow diagram of a method of updating the storage tree model, in accordance with exemplary embodiments of the present invention. The method is generally referred to by the reference number 500 and may begin at block 502, wherein one of the tree sources 108 detects a change in one of its nodes. In exemplary embodiments, a node change may include any change to the data stored at the node or one of the node's child nodes. For example, a node change may include the addition or deletion of a file, a change of the node or one of the node's files, the addition or deletion of a node, and the like.

In exemplary embodiments of the present invention, detection of node changes may be performed by the tree sources 108 rather than the server 104. Methods of detecting changes may depend on the characteristics of the physical device represented by the tree source 108. In some embodiments, the tree source 108 may periodically analyze the portion of the storage network 100 corresponding to the tree source 108 to detect differences, for example, file changes and the like. In other embodiments, the storage objects 110 may provide change flags or events that inform the tree source 108 that the storage network 108 has changed. In this way, system resource requirements (CPU, network, communications, memory) of maintaining the entire tree model in memory, or polling for changes, are isolated to the single tree source 108 that interfaces with the storage objects 110. Thus, the computing demands on higher levels of the system such as the server 104 may be reduced. In some embodiments, a change flag or event may be generated by a physical device, such as a disk drive. In other embodiments, the change flag or event may be generated by software, for example, the GUI 106, an application programming interface (API), and the like.

When the tree source 108 detects a change in one of its nodes, including the root node, for example, tree source 108, the tree source 108 sends the tree integrator 112 an event that notifies the tree integrator 112 that a change in the tree has occurred. The tree integrator 112 may update the tree table, starting at block 504. In other exemplary embodiments, the tree table and the tree model may be updated periodically and block 502 may be eliminated.

At block 504, the tree integrator 112 receives the current node cookie and current child cookie for each of the root nodes that have a viewing registration. As stated above, changes to a node or a child node may also result in a change to the cookies of that node. Thus, a change in the cookies of the root node may trigger an update of that node in the tree model. Furthermore, if a child cookie has changed, then the tree integrator 112 may recursively descend through the lower levels of the storage network 100 and update the tree model until it finds a child cookie that hasn't changed. For purposes of the present description, the term "present node" describes the node that is currently being analyzed by the tree integrator 112. The present node may start as one of the root nodes, for example, one of the tree sources 108.

At block 506, the current node cookie and the prior node cookie of the present node are compared to determine whether the present node has changed. If the current node cookie and the prior node cookie are different, the method 500 advances to block 508, wherein the server 104 receives updated tree information for the present node. For example, the server 104 may obtain file names and details, folder names, subfolder names, and the like. The updated information is saved to the tree model and the server 104 sends an event to the client server 102 indicating that one of the nodes visible to the client 102 has changed. For example, referring to FIG. 5, the current and prior node cookies for node A do not match. Accordingly, in this example, the server 104 may update node A in the tree model and send an event to the client server 102 indicating that node A has changed. The method 500 then advances to block 510. If the current node cookie and the prior node cookie are the same, the method 500 skips block 508 and advances to block 510.

At block 510, the current child cookie and the prior child cookie of the present node are compared to determine whether any of the present node's child nodes have changed. If the current child cookie and prior child cookie match for the present node, the process flow may advance to block 514, wherein the tree integrator 112 may advance to an adjacent node. The adjacent node may be any node that is at the same or higher level in the tree model compared to the present node. For example, the adjacent node may be another root node.

If the current child cookie and the prior child cookie are different, the process flow of method 500 advances to block 512, wherein the tree integrator 112 receives node information for all of the node's child nodes. If any of the child node's current node cookies are different from the child node's prior node cookies, the server 104 receives updated tree information for that child node. The updated tree information is saved to the tree model and the server 104 sends an event to the client system 102 indicating that a child node has changed. If new nodes are added or nodes are deleted, events may be sent to the client system 102 indicating these changes to the tree model. Next, the process flow may advance to block 516, wherein the tree integrator 112 advances to one of the child nodes of the present node.

After sending the relevant events to the client system 102, the process flow of method 500 returns to step 506, wherein the current and prior node cookies are compared for the next node. In other words, the present node becomes the node that the tree integrator advanced to in blocks 514 or 516. In this way, the method 500 may be applied recursively as it descends the tree model from the root node. The method 500 may be applied for each node that has an active viewing registration.

In exemplary embodiments of the present invention all of the events sent from the server 104 to the client 102 may be sent as they are generated. In some exemplary embodiments, the events may be bundled into transaction units that include several events. For example, the client system 102 may make a blocking call to a "getEvents" method that does not return until the server 104 obtains events for that client system 102. After the actively viewed nodes have been updated, the tree table will also be updated to reflect that each node has been updated and is now current. In one exemplary embodiment, the prior node cookies and prior child cookies will be set the same value as the respective current node cookies and current child cookies.

Figure 6:
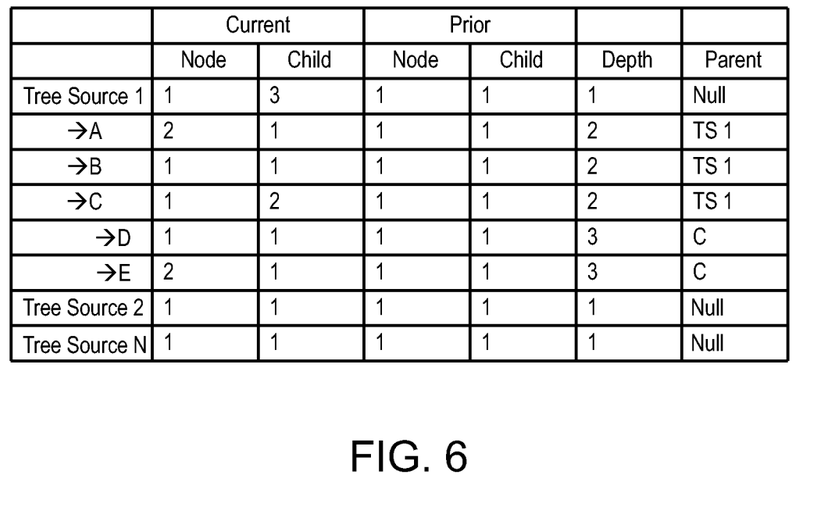
FIG. 6 is graphical representation of tree table of FIG. 3 after some nodes have been changed, in accordance with exemplary embodiments of the present invention.

FIG. 6 is graphical representation of the tree table of FIG. 3 after some nodes have been changed, in accordance with exemplary embodiments of the present invention. As shown in FIG. 6, tree source 1 and nodes A, C, and E have changed. In this example, node A itself has changed, for example, a file may have been added to the node, thus the node cookie has been incremented from one to two. Furthermore, node E has changed, thus the node cookie for node E has been incremented from one to two and the child cookie of node E's parent node, node C, has been incremented from one to two. Further, the child cookie of the parent node of node A and node E, tree source 1, has been incremented twice, once for the change to node A and once for node E. Thus, the child cookie of tree source 1 has been incremented from one to three. Using the updated cookie information, the tree integrator 112 may compare the current cookies and the prior cookies to determine which nodes of the tree model to update.

Figure 7:
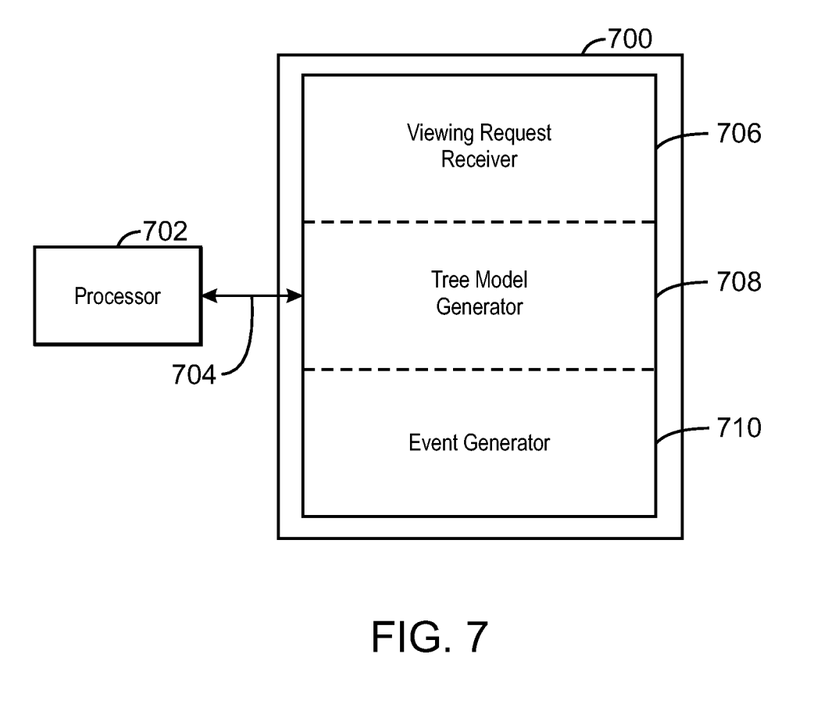
FIG. 7 is a block diagram of a tangible, machine-readable medium, in accordance with an embodiment of the present invention.

FIG. 7 is a block diagram showing a tangible, machine-readable medium that stores code adapted to facilitate the segmentation of Web content, in accordance with an exemplary embodiment of the present invention. The tangible, machine-readable medium is generally referred to by the reference number 700. The tangible, machine-readable medium 700 can comprise RAM, a hard disk drive, an array of hard disk drives, an optical drive, an array of optical drives, a non-volatile memory, a USB drive, a DVD, a CD, and the like. In one exemplary embodiment of the present invention, the tangible, machine-readable medium 700 can be accessed by a processor 702 over a computer bus 704.

The various software components discussed herein can be stored on the tangible, machine-readable medium 700 as indicated in FIG. 7. For example, a first block 706 on the tangible, machine-readable medium 600 may store viewing request receiver. The viewing request receiver may obtain a viewing registration from a client system 102 indicating that the client system 102 is actively viewing the requested node. A second block 708 can include a tree model generator adapted to add nodes from the storage tree to the tree model based on the viewing requests received from the client systems. A third block 710 can include an event generator adapted to send an even to the client system when a node has changed if the client system has a viewing registration for the node. The tangible, machine-readable medium 700 may also include other software components, for example, a tree table generator that is used to determine which nodes are being viewed and whether nodes of the storage tree have changed. Although shown as contiguous blocks, the software components can be stored in any order or configuration. For example, if the tangible, machine-readable medium 700 is a hard drive, the software components can be stored in non-contiguous, or even overlapping, sectors.

What is claimed is:

1. A method of generating a representation of a storage network, comprising:
   obtaining a request from a client system to view contents of a node in a tree model;
   receiving tree information for the node in the request;
   adding the tree information to the tree model;
   receiving a first cookie corresponding to the node and adding the node and the first cookie to a tree table; and
   receiving a second cookie corresponding to the node and comparing the second cookie with the first cookie to determine whether the node or one of the node's child nodes has changed.

2. The method of claim 1, further comprising identifying a root node via a registry and adding the root node to an initial tree model.

3. The method of claim 2, further comprising receiving an indication from the root node that indicates that one or more of the root node's child nodes have changed.

4. The method of claim 1, wherein obtaining the request from the client system to view the contents of the node comprises receiving a viewing registration from the client system.

5. The method of claim 1, comprising sending at least a portion of the tree model to the client system based on which nodes of the tree model have viewing registrations from the client system.

6. The method of claim 1, comprising sending an event to the client system to indicate that the tree model has changed, wherein the event causes the client to receive an updated tree model.

7. The method of claim 1, comprising obtaining a request from the client system to close a node in the tree model and remove the node from the tree model.

8. A storage network, comprising:
   a processor that executes machine-readable instructions;
   a tangible, non-transitory, computer-readable medium that stores instructions that are executable by the processor, the instructions comprising:
      a viewing request receiver configured to receive a viewing request from a client to view a node of the storage network; and a tree model generator configured to receive the viewing request from the client and add the node to a tree model;

wherein the node is associated with an information packet that indicates whether the node has changed; and wherein the information packet comprises a node cookie and a child cookie, the node cookie is incremented if the node changes, and the child cookie is incremented if the child node has changed.

9. The storage network of claim 8, wherein the machine-readable instructions comprise an event receiver configured to receive an indication from a tree source indicating that the node has changed.

10. The method of claim 9, wherein the tree source comprises a RAID array.

11. The storage network of claim 8, wherein the machine-readable instructions comprise an event generator configured to send an indication to the client that a portion of the tree model has changed.

12. The storage network of claim 8, wherein the instructions comprise a tree integrator that generates a tree table corresponding to a viewed portion of the storage network, the tree table providing an indication that the node has changed.

13. The method of claim 12, wherein the tree table comprises a data entry for a prior node cookie, a current node cookie, a prior child cookie and a current node cookie.

14. The method of claim 8, wherein the instructions are stored on a central server and wherein the central server sends a portion of the tree model to a client system.

15. A tangible, non-transitory, computer-readable medium, comprising code configured to direct a processor to:

receive a viewing request from a client to view a node of the storage network;

add the node to a tree model;

send at least a portion of the tree model to the client based on the clients viewing request;

receive a first cookie corresponding to the node and add the node and the first cookie to a tree table; and receive a second cookie corresponding to the node and compare the second cookie with the first cookie to determine whether the node or one of the node's child nodes has changed.

16. The tangible, computer-readable medium of claim 15, comprising code configured to direct the processor to generate a tree table comprising the node and a data set that indicates whether the node or a child of the node has changed.

* * * * *